(12) United States Patent
Choi

(10) Patent No.: US 7,237,821 B2
(45) Date of Patent: Jul. 3, 2007

(54) STROLLER WITH PLAYING TOOL

(75) Inventor: Moon Choi, Seoul (KR)

(73) Assignee: Korea Earphonetech Co., Ltd., Gyeonggi-Do (KR)

( * ) Notice: Subject to any disclaimer, the term of this patent is extended or adjusted under 35 U.S.C. 154(b) by 0 days.

(21) Appl. No.: 11/472,794

(22) Filed: Jun. 22, 2006

(65) Prior Publication Data

US 2006/0273612 A1   Dec. 7, 2006

Related U.S. Application Data

(63) Continuation of application No. PCT/KR2004/003353, filed on Dec. 20, 2004.

(51) Int. Cl.
*B62B 7/00* (2006.01)

(52) U.S. Cl. ..................... 296/97.1; 446/227

(58) Field of Classification Search ............ 296/97.21; 280/642, 647; 446/175, 227, 484
See application file for complete search history.

(56) References Cited

U.S. PATENT DOCUMENTS

| 4,725,253 A * | 2/1988 | Politte ........................ 441/130 |
| 4,973,286 A | 11/1990 | Davison |
| 5,071,149 A | 12/1991 | Perego |
| 5,590,892 A | 1/1997 | Hu |
| 5,668,333 A * | 9/1997 | Horton et al. ............ 84/470 R |
| 6,592,425 B2 * | 7/2003 | Bapst et al. ................. 446/227 |
| 6,659,835 B1 * | 12/2003 | Allen ......................... 446/142 |
| 6,991,509 B1 * | 1/2006 | Carley et al. ............... 446/175 |
| 2002/0061696 A1 * | 5/2002 | Blonder ...................... 446/14 |
| 2002/0102908 A1 * | 8/2002 | Chan ......................... 446/269 |
| 2002/0109321 A1 * | 8/2002 | Turner et al. ............ 280/47.38 |
| 2003/0132612 A1 * | 7/2003 | Pike et al. .................. 280/642 |
| 2004/0077269 A1 * | 4/2004 | Oren et al. ................. 446/227 |
| 2004/0134526 A1 * | 7/2004 | Freedman .................. 135/20.3 |
| 2004/0259070 A1 * | 12/2004 | Goodstein .................... 434/428 |
| 2005/0026536 A1 * | 2/2005 | Armbruster et al. ........ 446/227 |
| 2005/0227576 A1 * | 10/2005 | Armbruster et al. ........ 446/227 |
| 2006/0082183 A1 * | 4/2006 | Hudson ..................... 296/77.1 |
| 2006/0131840 A1 * | 6/2006 | Donay ......................... 280/642 |

FOREIGN PATENT DOCUMENTS

JP            14-224461 A    8/2002
KR         86-0005849 U    6/1986

* cited by examiner

*Primary Examiner*—Lori L. Lyjak
(74) *Attorney, Agent, or Firm*—Knobbe Martens Olson & Bear LLP

(57) ABSTRACT

A stroller includes a playing tool main body coupled on a guard bar, a playing tool coupled on a plurality of rotational shaft installed in the main body, a cover formed to be transparent and protecting the playing tool, a driving motor installed in the main body and driven by power from a solar cell, and a transmission unit for transmitting driving force generated from the driving motor to the rotational shafts.

18 Claims, 4 Drawing Sheets

STROLLER WITH PLAYING TOOL

CROSS-REFERENCE TO RELATED APPLICATIONS

This application is a continuation application under 35 U.S.C. § 365 (c) claiming the benefit of the filing date of PCT Application No. PCT/KR2004/003353 designating the United States, filed Dec. 20, 2004. The PCT Application was published in English as WO 2005/061303 on Jul. 7, 2005, and claims the benefit of the earlier filing date of Korean Patent Application No. 20-2003-0039752, filed Dec. 22, 2003. The contents of the Korean Patent Application No. 20-2003-0039752 and the International Application No. PCT/KR2004/003353 including its publication are incorporated herein by reference in their entirety.

BACKGROUND

1. Field

The present invention relates to a stroller with a playing tool (a toy), and more particularly, to a stroller with a playing tool formed on a front guard bar and operated by a solar cell so that a baby riding the stroller can play with the tool 2. Description of the Related Art A stroller is designed to move by wheels coupled on a bottom of a stroller frame. That is, in a state a baby is riding the stroller, a user (parent) can pushes a handle to move the stroller. Typically, strollers are designed such that the baby is only to seat thereon. There are no playing tools installed on the stroller.

SUMMARY OF THE INVENTION

One aspect of the invention provides a stroller. The stroller comprises a stroller body comprising a frame, a seat and a guard bar. The stroller further comprises an amusement device coupled to the guard bar. The amusement device comprises a solar cell, an electric motor electrically connected to the solar cell so as to receive electric power from the solar sell, a transmission mechanism configured to transmit a force generate by the electric motor, and at least one amusement feature configured to move using the force transmitted through the transmission mechanism.

The foregoing stroller may further comprises a transparent cover covering the at least one amusement feature. The solar cell may be formed on the transparent cover. The at least one amusement feature may be configured to rotate using the force transmitted through the transmission mechanism. The at least one amusement feature may be formed on a rotational plate which may be directly engaged with a rotational shaft. The transmission mechanism may comprise at least one pulley and at least one belt. The at least one amusement features may comprise at least two amusement features, which are configure to rotate at different speeds. The at least one amusement features may comprise at least two amusement features, which are configure to rotate at different rotational directions.

In the foregoing stroller, the transmission mechanism may comprise: a fan configured to blow wind as the electric motor rotates; at least one tubes comprising a first end and a second end, the first end configured to receive wind from the fan, the second end configured to discharge the wind received; and means for converting wind to rotation of a shaft. The means may comprise wings configured to be pushed by wind. The means may comprise a substantially hemispherically recessed surface configured to face the second end. The means may comprise a substantially planar surface configured to face the second end.

Still, the foregoing stroller may further comprise a sound generator. The sound generator may be configured to generate sound as the at least one amusement feature moves. The amusement device may be integrally formed with the guard bar. The amusement device may be located in front of the seat. The transmission mechanism and the electric motor may be separated from the at least one amusement feature by a separating plate. The at least one amusement feature may comprise one or more shapes selected from the groups consisting of number-shapes, animal-shapes, letter-shapes and human-shapes.

One aspect of the invention provides a stroller with a playing tool formed on a front guard bar and operated by a solar cell so that a baby riding the stroller can play with the tool without changing the battery. Another aspect of the invention provides a stroller with a playing tool that can be operated by a simple structure in power transmission, thereby being easily manufactured.

Embodiments of the present invention provide a stroller comprising a playing tool main body (mechanism portion) coupled on a guard bar; a playing tool coupled on a plurality of rotational shaft installed in the main body; a cover formed to be transparent and protecting the playing tool; a driving motor installed in the main body and driven by power from a solar cell; and a transmission unit for transmitting driving force generated from the driving motor to the rotational shafts.

In certain embodiments, the transmission unit comprises a plurality of transmission pulleys different in a size from each other and coupled to the respective rotational shafts, and a plurality of belts wound around the transmission pulleys to transmit the rotational force. Alternatively, the power transmission unit comprises a plurality of blower tubes exhausting wind generated from a blower fan of the driving motor and a plurality of wind receiving members integrally rotating with the rotational shafts by the wind exhausted from the blower tubes.

The wind receiving member may be provided at an outer surface with a wind receiving plate. The wind receiving plate may be formed in a plate-shape and the wind receiving plate is formed in a hemispherical-shape. The main body may be designed to generate sound when the driving motor is driven and the rotational shafts are different in a rotational speed/direction from each other and the playing tools are also different in a rotational speed/direction from each other.

DETAILED DESCRIPTION OF EMBODIMENTS

Various features and advantages of the present invention will be described in more detail in conjunction with embodiments illustrated in the accompanying drawings.

Figure 1:
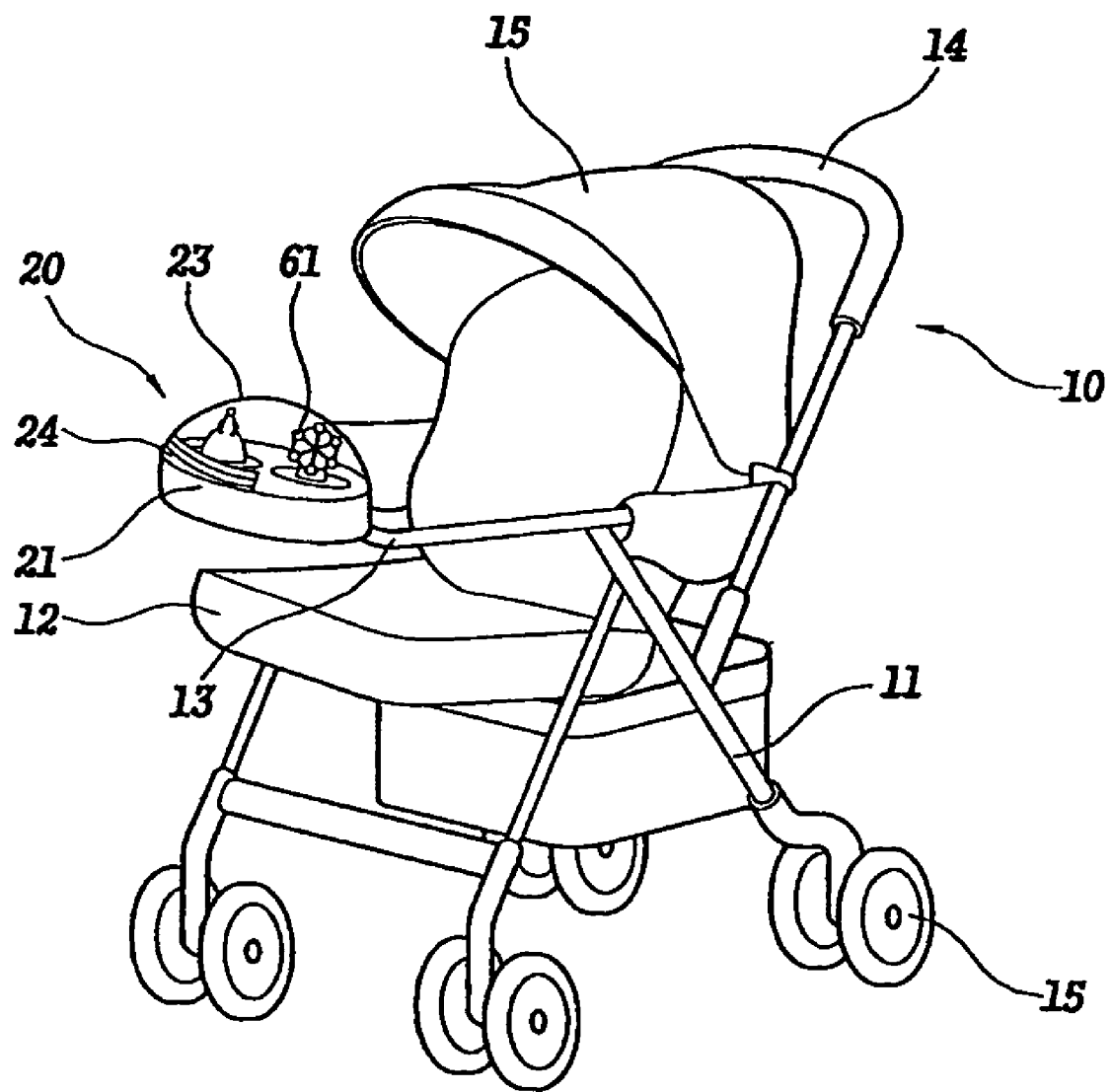
FIG. 1 is a perspective view of a stroller with a playing tool according to an embodiment of the present invention.

Referring to the embodiment illustrated in FIG. 1, the stroller 10 includes a frame 11, a seat 12, a guard bar 13, a handle 14, and a plurality of wheels 15. Further, a playing tool or toy 20 is installed on the guard bar 13 of the stroller 10. In some embodiments, the playing tool 20 may be detachably coupled to the guard bar 13. The playing tool 20 may be coupled with the guard bar 13 by a screw and the like. In other embodiments, the playing tool 20 may be integrally formed with the guard bar 13. For example, the playing tool 20 and the guard bar 13 may be formed together by injection molding.

Figure 2:
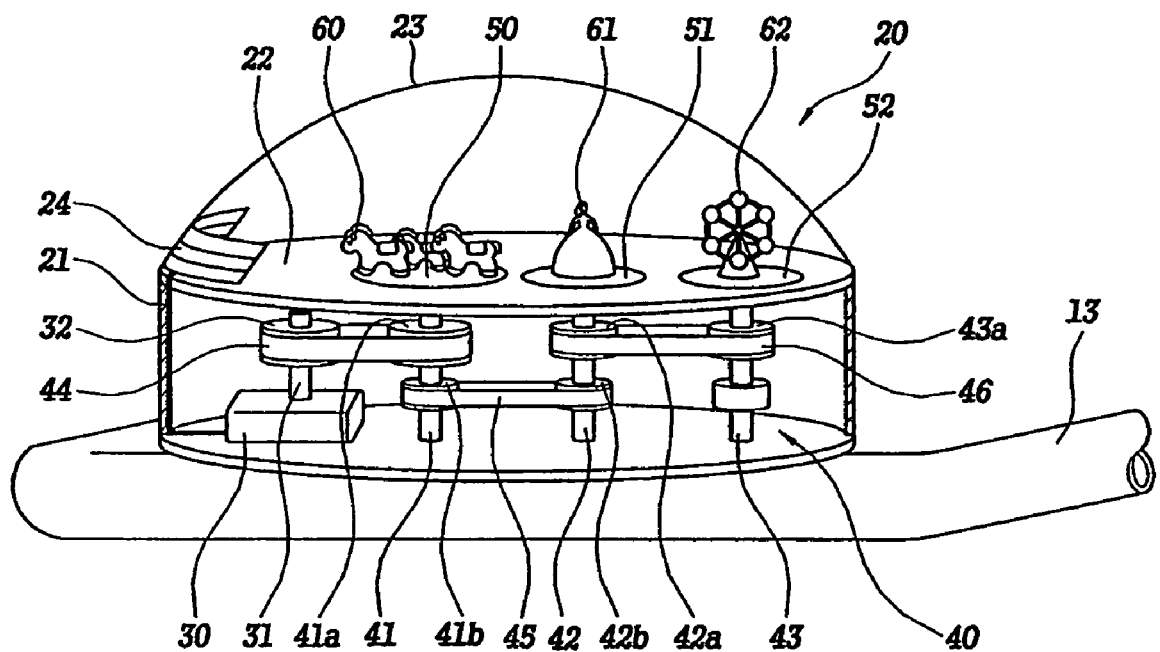
FIG. 2 is a partly broken perspective view of the playing tool depicted in FIG. 1.

FIG. 2 shows the playing tool 20 in more detail. In the illustrated embodiment, the playing tool 20 generally consists of a mechanism portion 21 and an amusement portion located above the mechanism portion 21. The mechanism portion 21) is attached onto the guard bar 13. A plate 22 separates the mechanism portion 21 from the amusement portion therebetween. A transparent cover 23 is placed over the plate 22 and encloses the amusement portion. A solar cell 24 is formed on the cover 23.

The inside of the mechanism portion 21 may be sealed by the plate 22 and the cover 23 or other means to prevent the water from inflicting thereinto. The mechanism portion 21 includes a driving motor 30 and a power transmission unit 40. The driving motor 30 may be driven by electric power supplied from the solar cell 24. The power transmission unit 40 transmits rotational power generated from the driving motor 30 to amusement portion.

The power transmission unit 40 includes a driving pulley 32 connected to the driving motor 30 via the driving shaft 31. The power transmission unit 40 further includes first, second and third rotational shafts 41, 42 and 43, which are spaced apart from each other at a predetermined distance. The power transmission unit 40 additionally includes a plurality of transmission pulleys 41a, 41b, 42a, 42b and 43a, and belts 44, 45 and 46. The transmission pulleys 41a, 41b, 42a, 42b and 43a are coupled to the first, second and third rotational shafts 41, 42 and 43. The belts 44, 45 and 46 transmit rotational force among the transmission pulleys 41a, 41b, 42a, 42b and 43a.

In embodiments, the transmission pulleys 41a, 42b, 42a, 42b and 43a may be a flat pulley or a timing pulley. The belts 44, 45 and 46 may be a flat belt or a timing belt. In embodiments, the sizes of the transmission pulleys 41a, 41b, 42a, 42b and 43a may be different from each other so that the transmission speeds of the rotational force to the first, second and third rotational shafts 41, 42 and 43 via the belt 44, 45 and 46 can be different.

In the illustrated embodiment, rotational plates 50, 51 and 52 are coupled to the first, second and third rotational shafts 41, 42 and 43, respectively. Various amusement features 60, 61, 62 are fixed to the rotational plates 50, 51 and 52. In some embodiments, the rotational plates 50, 51 and 52 are rotatably located on the upper plate 22.

In the above-described stroller, when an operation button electrically connected to the driving motor 30 is turned on, the driving motor 30 is driven by the power supplied from the solar cell 24 to rotate the driving shaft 31 and the driving pulley 32. The rotational force is transmitted to the first, second and third rotational shafts 41, 42 and 43 via the belts 44, 45 and 46 and transmission pulleys 41a, 41b, 42a, 42b and 43a so as to rotate the first, second and third rotational shafts 41, 42 and 43. In some embodiments, the first, second and third rotational shafts 41, 42 and 43 may rotate with a different speed from one another.

By the rotation of the first, second and third rotational shafts 41, 42 and 43, the rotational plates 50, 51 and 52 rotate. As a result, the amusement features 60, 61 and 62 integrated with the respective rotational shafts 50, 51 and 52 rotate with a different speed from each other. The baby sitting in the stroller 10 may enjoy the movements of these amusement features 60, 61 and 62.

In the foregoing embodiments, since as the electric power is supplied by the solar cell 24, there may be no need to charge a battery or change batteries over extended use of the stroller 10.

Figure 3:
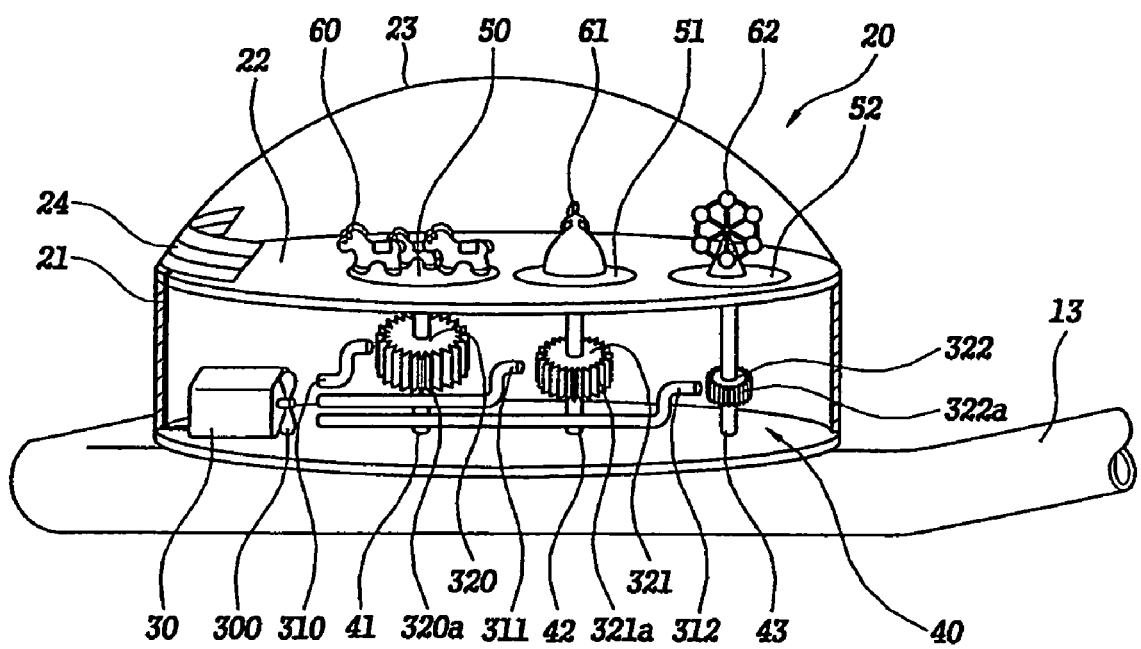
FIG. 3 is a perspective view of the playing tool according to another embodiment of the present invention.

FIG. 3 shows another embodiment of the playing tool or amusement box 20. In the illustrated mechanism portion 21, a blower fan 300 is connected to the shaft of the driving motor 30 and is configured to blow wind as the driving motor 30 runs. A plurality of blower tubes 310, 311 and 312 are provide along with the blower fan 300 so as to transfer wind generated by the blower fan 300 to other locations within the mechanism portion.

One end of each the blower tube 310, 311, 312 is located in front of the blower fan 300 so as to receive wind from the blower fan 300. The other end of each blower tube 310, 311, 312 is located in front of and faces a wind receiving member 320, 321, 322. The wind receiving members 320, 321, 322 are configured to receive the wind and rotate by the force of the wind the first, second and third rotational shafts 41, 42 and 43.

In some embodiments, the ends of the blower tubes 310, 311 and 312 facing the wind receiving members are oriented such that at least one of the wind receiving members 320, 321 and 322 rotates in a different direction from the others. The wind receiving members 320, 321 and 322 are configured to rotate the first, second and third rotational shafts 41, 42 and 43 at different rotational speeds. In some embodiments, each wind receiving member 320, 321, 322 comprises a round piece engaged around one of the rotational shafts 41, 42, 43, and the round pieces have diameters different from one another. In embodiments, the wind receiving members 320, 321 and 322 comprises a plurality of wind receiving plates 320a, 321a, 322a to effectively receive wind from the blower tubes 310, 311 and 312.

In the embodiment illustrated in FIG. 3, when the user turns on the operation button, the driving motor 30 is driven by the power from the solar cell 24, and the blower fan 300 rotates to generate wind. The wind generated from the blower fan 300 is transmitted through the blower tubes 310, 311 and 312 to the end of the blower tubes facing the wind receiving members 320, 321, 322. Then, the wind collides with and pushes the wind receiving plates 320a, 321a, 322a, of the wind receiving members 320, 321, 322. As a result, the receiving members 320, 321 and 322 rotate, thereby rotating the first, second and third rotational shafts 41, 42 and 43. As noted above, the rotational shafts may rotate at different speeds from one another. Also, the rotational shafts may rotate in different rotational directions from one another. As a result, the rotational plates 50, 51 and 52 and the amusement features 60, 61 and 62 rotate or move.

Figure 4:
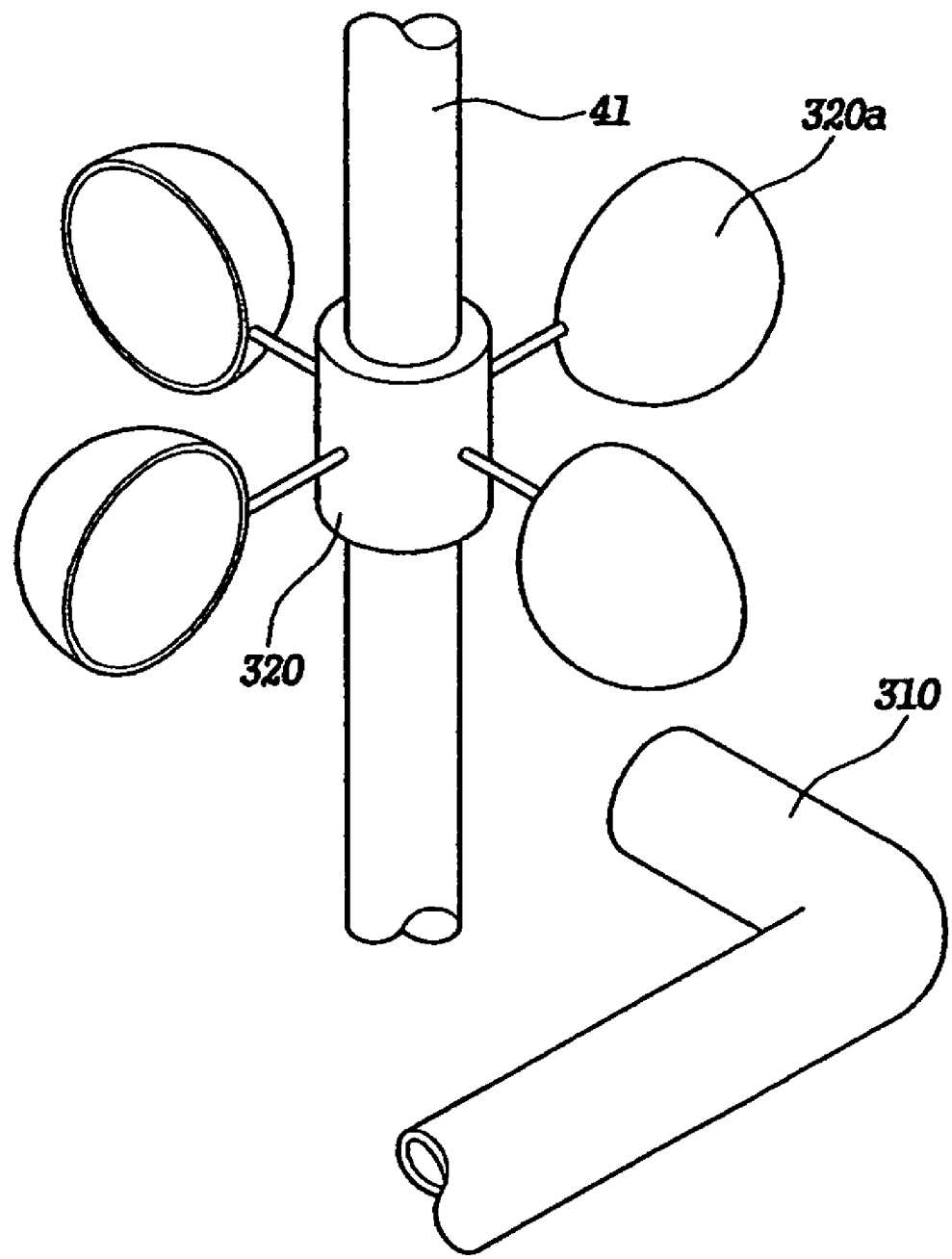
FIG. 4 is a partial perspective view of a wind plate according to an embodiment of the present invention.

FIG. 4 shows a modified example of the wind receiving members 320, 321 and 322. The wind receiving plates 302a, 321a and 322a coupled to the first, second and third rotational shafts 41, 42 and 43 are formed in a hemispherical-shape so that they can be more effectively rotated when pushed by wind.

Further, in some embodiments, the stroller 10 may further configured to create or generate sounds while rotating the amusement features. The amusement features may have a number of different shapes. Such different shapes include a number-shape, an animal-shape, and a letter-shape. The number-shape or the letter-shape may provide education to the baby sitting in the stroller as well as amusement.

The stroller has a playing tool or moving amusement features formed on a front guard bar and operated by a solar cell so that a baby riding the stroller can enjoy or play with the tool. Since a solar cell is used as power source for driving the driving motor, the maintenance may be convenient and costless.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A stroller comprising:
a stroller body comprising a frame, a seat and a guard bar; and
an amusement device coupled to the guard bar, the amusement device comprising:
a solar cell,
an electric motor electrically connected to the solar cell so as to receive electric power from the solar cell,
a transmission mechanism configured to transmit a force generated by the electric motor, and
at least one amusement feature configured to move using the force transmitted through the transmission mechanism,
wherein the stroller further comprises a transparent cover covering the at least one amusement feature.

2. A stroller comprising:
a stroller body comprising a frame, a seat and a guard bar; and
an amusement device coupled to the guard bar, the amusement device comprising:
a solar cell,
an electric motor electrically connected to the solar cell so as to receive electric power from the solar cell,
a transmission mechanism configured to transmit a force generated by the electric motor, and
at least one amusement feature configured to move using the force transmitted through the transmission mechanism,
wherein the transmission mechanism and the electric motor are separated from the at least one amusement feature by a separating plate.

3. The stroller of claim 1, wherein the solar cell is formed on the transparent cover.

4. The stroller of claim 1, wherein the at least one amusement feature is configured to rotate using the force transmitted through the transmission mechanism.

5. The stroller of claim 1, wherein the at least one amusement feature is formed on a rotational plate which is directly engaged with a rotational shaft.

6. The stroller of claim 1, wherein the transmission mechanism comprises at least one pulley and at least one belt.

7. The stroller of claim 1, wherein the at least one amusement features comprises at least two amusement features, which are configured to rotate at different speeds.

8. The stroller of claim 1, wherein the at least one amusement features comprises at least two amusement features, which are configured to rotate at different rotational directions.

9. The stroller of claim 1, wherein the transmission mechanism comprises:
a fan configured to blow wind as the electric motor rotates;
at least one tubes comprising a first end and a second end, the first end configured to receive wind from the fan, the second end configured to discharge the wind received; and
means for converting wind to rotation of a shaft.

10. The stroller of claim 9, wherein the means comprises wings configured to be pushed by wind.

11. The stroller of claim 9, wherein the means comprises a substantially hemispherically recessed surface configured to face the second end.

12. The stroller of claim 9, wherein the means comprises a substantially planar surface configured to face the second end.

13. The stroller of claim 1, further comprising a sound generator.

14. The stroller of claim 13, wherein the sound generator is configured to generate sound as the at least one amusement feature moves.

15. The stroller of claim 1, wherein the amusement device is integrally formed with the guard bar.

16. The stroller of claim 1, wherein the amusement device is located in front of the seat.

17. The stroller of claim 1, wherein the transmission mechanism and the electric motor are separated from the at least one amusement feature by a separating plate.

18. The stroller of claim 1, wherein the at least one amusement feature comprises one or more shapes selected from the groups consisting of number-shapes, animal-shapes, letter-shapes and human-shapes.

* * * * *

UNITED STATES PATENT AND TRADEMARK OFFICE
CERTIFICATE OF CORRECTION

| | |
|---|---|
| PATENT NO. | : 7,237,821 B2 |
| APPLICATION NO. | : 11/472794 |
| DATED | : July 3, 2007 |
| INVENTOR(S) | : Moon Choi |

It is certified that error appears in the above-identified patent and that said Letters Patent is hereby corrected as shown below:

On the title page, after the text in the first column "US 2006/0273612 A1 Dec. 7, 2006" please insert the following:

--(30)  Foreign Application Priority Data
December 22, 2003 (KR) ........................ 20-2003-0039752--

Signed and Sealed this

Fourth Day of March, 2008

JON W. DUDAS
*Director of the United States Patent and Trademark Office*